US012801256B2

(12) United States Patent
Tsuruta

(10) Patent No.: US 12,801,256 B2
(45) Date of Patent: Nov. 17, 2026

(54) IMAGE DISPLAY APPARATUS

(71) Applicant: SHARP KABUSHIKI KAISHA, Sakai City (JP)

(72) Inventor: Kentaroh Tsuruta, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 251 days.

(21) Appl. No.: 18/750,576

(22) Filed: Jun. 21, 2024

(65) Prior Publication Data

US 2024/0427468 A1 Dec. 26, 2024

(30) Foreign Application Priority Data

Jun. 23, 2023 (JP) ................................. 2023-103584

(51) Int. Cl.
*G06F 3/0481* (2022.01)
*G06F 3/0484* (2022.01)
*G06F 3/14* (2006.01)

(52) U.S. Cl.
CPC .......... *G06F 3/0481* (2013.01); *G06F 3/0484* (2013.01); *G06F 3/14* (2013.01)

(58) Field of Classification Search
None
See application file for complete search history.

(56) References Cited

U.S. PATENT DOCUMENTS 8,788,259 B1 * 7/2014 Buryak ................... G06F 9/454 704/8
9,146,914 B1 * 9/2015 Dhaundiyal .......... G06F 40/166
11,620,292 B1 * 4/2023 Pearson ................ G06F 16/248 707/692
12,001,739 B1 * 6/2024 Colelli .................... G06F 21/44
2004/0207658 A1 * 10/2004 Awada ..................... G06F 9/451 715/826
2006/0230045 A1 * 10/2006 Konishi .................. H04L 67/51
2011/0131526 A1 * 6/2011 Vronay ................... G06F 3/048 715/808
2011/0137981 A1 * 6/2011 Ookuma ............ H04N 1/00464 709/203
2012/0010871 A1 * 1/2012 Ichimi ..................... G06F 9/454 704/8
2012/0294514 A1 * 11/2012 Saunders ............... G06V 20/30 382/218
2013/0097121 A1 * 4/2013 Jung ................... G06F 11/1415 707/E17.007
2014/0123063 A1 * 5/2014 Hwang ................. G06F 3/0482 715/810

(Continued)

FOREIGN PATENT DOCUMENTS

| | | |
|---|---|---|
| JP | 2003-234821 A | 8/2003 |
| JP | 2006-293585 A | 10/2006 |

*Primary Examiner* — Tuyetlien T Tran
(74) *Attorney, Agent, or Firm* — ScienBiziP, P.C.

(57) ABSTRACT

An image display apparatus including: a display configured to display various types of information to a user; an operation acceptor configured to receive a change of a language of the various types of information; and one or more controllers configured to control the display and the operation acceptor, wherein when the operation acceptor receives the change of the language, the controllers change the language and cause the display to display an undo key for changing the language back for a predetermined display time.

4 Claims, 14 Drawing Sheets

(56) References Cited

U.S. PATENT DOCUMENTS

2014/0215330 A1* 7/2014 Lee .................... G06F 3/04847 715/703
2014/0317573 A1* 10/2014 Hyeon .................. G06F 3/0482 715/835
2014/0331175 A1* 11/2014 Mesguich Havilio ...................... G06F 3/0481 715/863
2015/0324336 A1* 11/2015 Glezos .................... G06F 40/58 715/234
2016/0378305 A1* 12/2016 Shibukawa ........... G06F 3/1253 715/703
2017/0017376 A1* 1/2017 Han ........................ G06F 9/445
2017/0116184 A1* 4/2017 Bradley .................. G06F 40/58
2019/0191045 A1* 6/2019 Ikeda ................. H04N 1/00498
2019/0297206 A1* 9/2019 Koike ................... G06F 3/1285
2020/0021701 A1* 1/2020 Sekine ............... H04N 1/00498
2020/0021710 A1* 1/2020 Ikeda .................... G06F 21/608
2020/0125806 A1* 4/2020 Obana ..................... G06F 40/58
2020/0366803 A1* 11/2020 Schleede ............... G06F 3/0482
2021/0043109 A1* 2/2021 Mese .................... G09B 21/008
2021/0211551 A1* 7/2021 Kikuchi ............. H04N 1/00498
2023/0288905 A1* 9/2023 Kubota ................ G05B 19/409
2024/0184604 A1* 6/2024 Yim ........................ G06F 9/453
2024/0232543 A1* 7/2024 Horger .................... H04L 51/02
2025/0127670 A1* 4/2025 Sukumaran .......... A61B 5/6892

* cited by examiner

IMAGE DISPLAY APPARATUS

CROSS-REFERENCE TO RELATED APPLICATIONS

The present application claims priority from Japanese Application JP2023-103584, the content to which is hereby incorporated by reference in to this application.

BACKGROUND OF THE INVENTION

Field of the Invention

This disclosure relates to an image display apparatus and, more particularly, to an image display apparatus having a multilingual interface.

Description of the Background Art

Some recent image display apparatuses have a multilingual interface for setting the language used, based on the language selected by the user from a plurality of languages corresponding to users in various countries at the time of initial setup.

Once the language used is set, various types of information are displayed on the operation panel in that language.

In an image display apparatus having such a multilingual interface, a language not intended by the user may be set by an erroneous operation of the operation panel.

However, when the language erroneously set is a language which the user does not understand, even if the user tries to change the language back, the user cannot even open the language setting screen because the language displayed, including the home screen and the menu screen, is written in the language the user does not understand.

In order to solve such a problem, conventionally, there is known a portable electronic apparatus that allows the user to change the language used to a predetermined language by performing a predetermined key operation, regardless of the terminal status, so that only the language setting can be easily returned to the original setting.

In addition, there is known an electronic apparatus in which, for the "Setup Menu" on the printer setting screen and the "Lang=" menu on the language change screen, a message in the default language is displayed in addition to a message in the set language, so that even if the language setting of the menu is changed to a language that the user cannot read, the operation of changing the language back to the language the user can read can be easily performed.

By the way, multifunction peripherals such as multi-copiers installed in stores such as convenience stores at airports, sightseeing spots, or international event sites generally have multilingual interfaces because users from various countries who use various languages are expected to use the multifunction peripherals.

Various types of multifunction peripherals having such multilingual interfaces are currently on the market, and the functions that can be used differ depending on the type, making it difficult for store staff to inform users who use different languages that they need to perform a predetermined key operation to change the language used.

In addition, the method of displaying a message in the default language in addition to the message in the set language requires a larger display area for both of the languages to be displayed, but there may not be enough display space to enlarge the buttons displayed on the operation panel of the multifunction peripheral.

The present disclosure has been made in consideration of the above-described circumstances, and provides an image display apparatus capable of changing the language back more easily than before even if the user has erroneously changed the language.

SUMMARY OF THE INVENTION

An image display apparatus according to an aspect of the present disclosure includes: a display configured to display various types of information to a user; an operation acceptor configured to receive a change of a language of the various types of information; and one or more controllers configured to control the display and the operation acceptor, wherein when the operation acceptor receives the change of the language, the controllers change the language and cause the display to display an undo key for changing the language back for a predetermined display time.

In addition, an image display apparatus according to another aspect of the present disclosure includes: a display configured to display various types of information to a user; an operation acceptor configured to receive a change of a language of the various types of information; and one or more controllers configured to control the display and the operation acceptor, wherein when the operation acceptor receives the change of the language, the controllers change the language and cause the display to display a message asking whether or not to maintain the change of the language, a key for maintaining the language, and an undo key for changing the language back for a predetermined display time.

According to the present disclosure, an image display apparatus capable of, even if a user has erroneously changed the language, changing the language back more easily than before by displaying an undo key for a predetermined time after the language is changed.

DETAILED DESCRIPTION OF THE INVENTION

Figure 1:
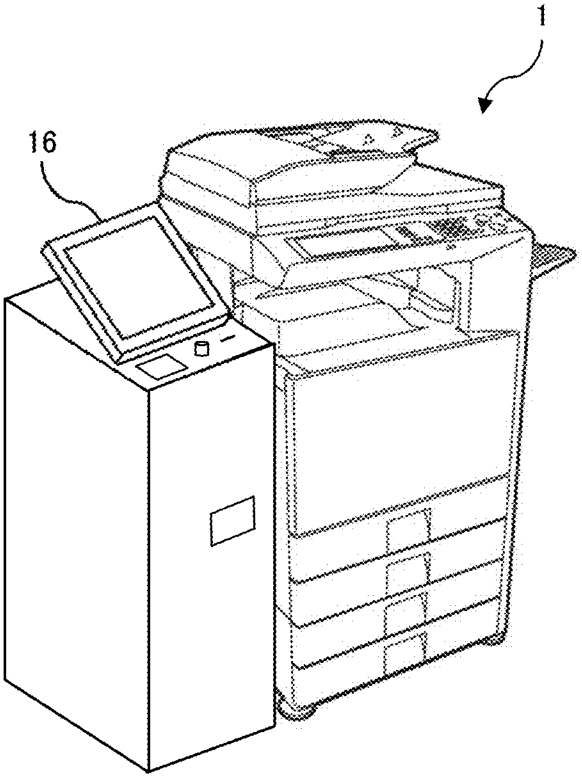
FIG. 1 is an explanatory diagram showing the appearance of a digital multifunction machine according to Embodiment 1 of the present disclosure.

In the present disclosure, the "image display apparatus" is an apparatus that displays images, such as a multifunction machine, a personal computer (PC), a public display, a monitor such as a TV, a display such as an electronic blackboard, a smartphone, and a tablet terminal.

In addition, the image display apparatus according to the present disclosure is provided with a touch panel that can be operated by touching the screen with a fingertip or the like.

Further, preferred modes of the present disclosure will be described.

In the image display apparatus according to the present disclosure, the undo key may be displayed in the language before the change.

In this way, an image display apparatus capable of, even if the user has erroneously changed the language and the language after the change is not understood by the user, easily changing the language back by displaying the undo key in the language before the change can be achieved.

In the image display apparatus according to the present disclosure, the undo key may be displayed in at least one of a letter, a number, a symbol, and a figure.

In this way, an image display apparatus capable of, even if users from various countries who use various languages have erroneously changed the language, change the language back more easily than before by displaying the undo key in a representation such as a symbol or a figure, which can be understood by users from any country.

In the image display device according to the present disclosure, the controllers may cause the display to erase the undo key and change the language back when the undo key is pressed, and cause the display to erase the undo key when the display time has elapsed without the undo key being pressed.

In this way, an image display apparatus capable of, even if a user has erroneously changed the language, changing the language back more easily than before by pressing the undo key after the language is changed.

In the image display apparatus according to the present disclosure, when the undo key is pressed, the controllers may cause the display to erase the undo key and change the language back, and then cause the display to display a language setting screen.

In this way, an image display apparatus capable of, even if a user has erroneously changed the language, changing the language back more easily than before by displaying a language setting screen when the undo key is pressed.

In the image display apparatus according to the present disclosure, the inquiry message, the key for maintaining the language, and the undo key for changing the language back may be displayed in the language after the change.

In this way, an image display apparatus capable of, even if a user has erroneously changed the language, changing the language back more easily than before by displaying a message in the language after the change, a key for maintaining the language, and an undo key for changing the language back.

Hereinafter, the present disclosure will be described in more detail with reference to the drawings. Note that the following description is illustrative in all respects and should not be construed as limiting the present disclosure.

Embodiment 1

A digital multifunction machine 1, which is an embodiment of the image display apparatus of the present disclosure, will be described with reference to FIG. 1 and FIG. 2.

FIG. 1 is an explanatory diagram showing the appearance of the digital multifunction machine 1 according to Embodiment 1 of the present disclosure.

The digital multifunction machine 1 is an apparatus such as a multifunction peripheral or an MFP which digitally processes image data and has a copy function, a printer function, a scanner function, and a facsimile function.

As shown in FIG. 1, the digital multifunction machine 1 includes an operation panel 16.

Figure 2:
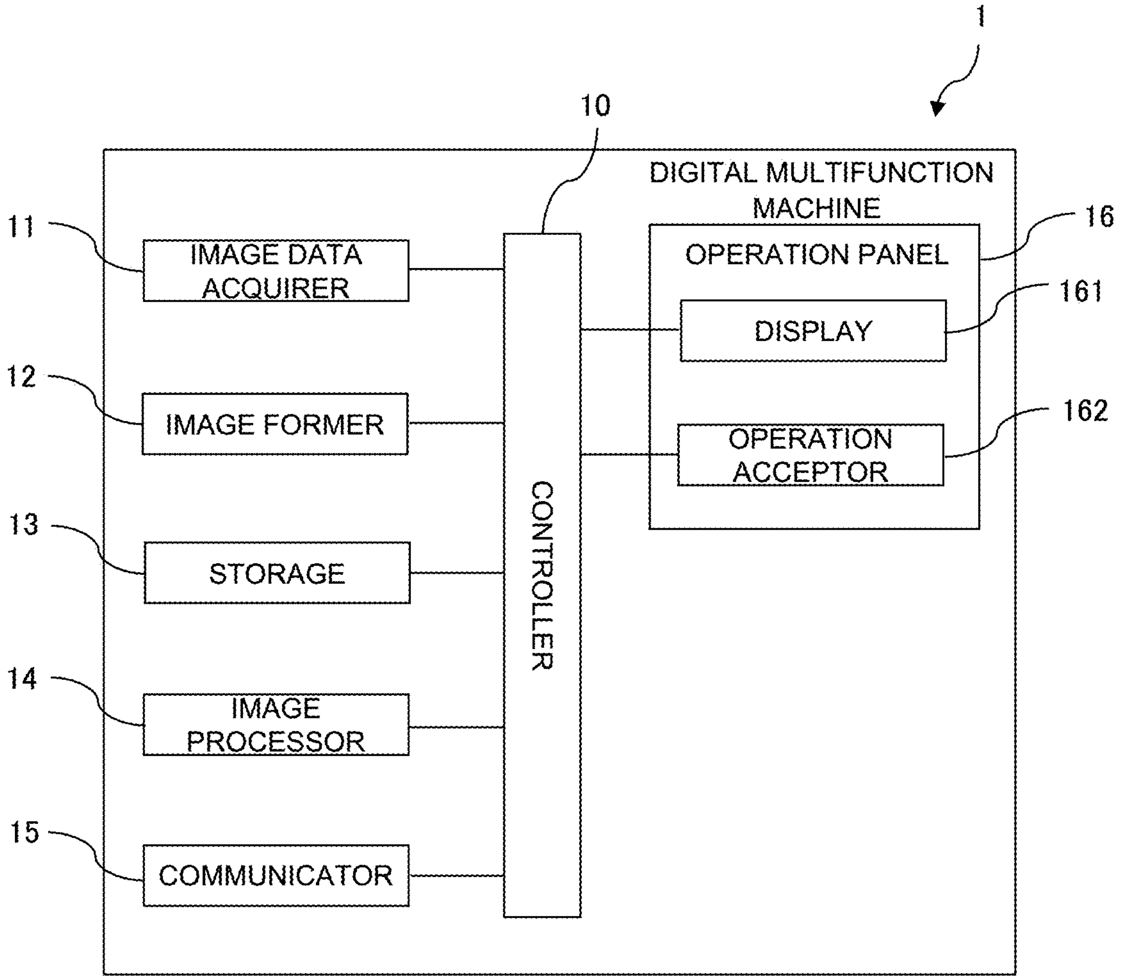
FIG. 2 is a block diagram showing a schematic configuration of the digital multifunction machine shown in FIG. 1.

FIG. 2 is a block diagram showing a schematic configuration of the digital multifunction machine 1 shown in FIG. 1.

As shown in FIG. 2, the digital multifunction machine 1 includes a controller 10, an image data acquirer 11, an image former 12, a storage 13, an image processor 14, a communicator 15, and an operation panel 16.

Each component of the digital multifunction machine 1 will be described below.

The controller 10 performs overall control of the digital multifunction machine 1, and is composed of one or more central processing units (CPUs), one or more random access memories (RAMs), one or more read only memories (ROMs), various interface circuits, and the like.

The controller 10 detects each sensor, and monitors and controls all loads such as a motor, a clutch, and an operation panel 16 in order to control the operation of the entire digital multifunction machine 1.

The image data acquirer 11 is a unit that reads a document placed on a document reading table to acquire image data.

The image data acquirer 11 may also acquire image data in a USB memory via a USB connector (not shown) or the like.

Further, image data may be acquired from an external terminal or the like via a wired or wireless network (not shown).

The image former 12 is a unit that prints out image data acquired by the image data acquirer 11 and processed by the image processor 14 on a sheet.

The storage 13 is an element or storage medium that stores information and control programs, and the like necessary for realizing various functions of the digital multifunction machine 1. For example, one or more semiconductor devices such as RAMs or ROMs, one or more hard disks, one or more flash storages, one or more solid state drives (SSDs), or other storage media are used.

The storage 13 stores information related to jobs such as printing and data necessary for executing the jobs such as image data.

The storage 13 also stores a plurality of types of language information and language setting data.

Note that the programs and the data may be stored in different devices, such as a hard disk drive for the area holding the data and a flash storage for the area holding the programs.

The image processor 14 is a unit that converts image data input from the image data acquirer 11 into an appropriate electric signal to be suitable for output such as enlargement or reduction, based on an analysis result of a command of a job such as printing acquired through the operation acceptor 162.

The communicator 15 is a unit that communicates with an external terminal (not shown) via a network to transmit and receive various types of data.

The operation panel 16 consists of a display panel composed of a liquid crystal panel or the like, and a capacitive touch panel or the like which is placed over the display panel and detects a position touched by a finger, and includes a display 161 and an operation acceptor 162.

The display 161 is a unit that displays various types of information.

The display 161 is a display device such as a monitor or a line display, composed of, for example, a CRT display, a liquid crystal display, or an EL display, for displaying electronic data such as a processing status of an operating system or application software.

The controller 10 displays the operation and status of the digital multifunction machine 1 through the display 161.

The operation acceptor 162 is an interface for operating the digital multifunction machine 1, and is a unit that receives a command from the user.

Example of Language Setting of Digital Multifunction Machine 1 According to Embodiment 1 of Present Disclosure Next, an example of language setting of the digital multifunction machine 1 according to Embodiment 1 of the present disclosure will be described with reference to FIG. 3 to FIG. 5.

Figure 3:
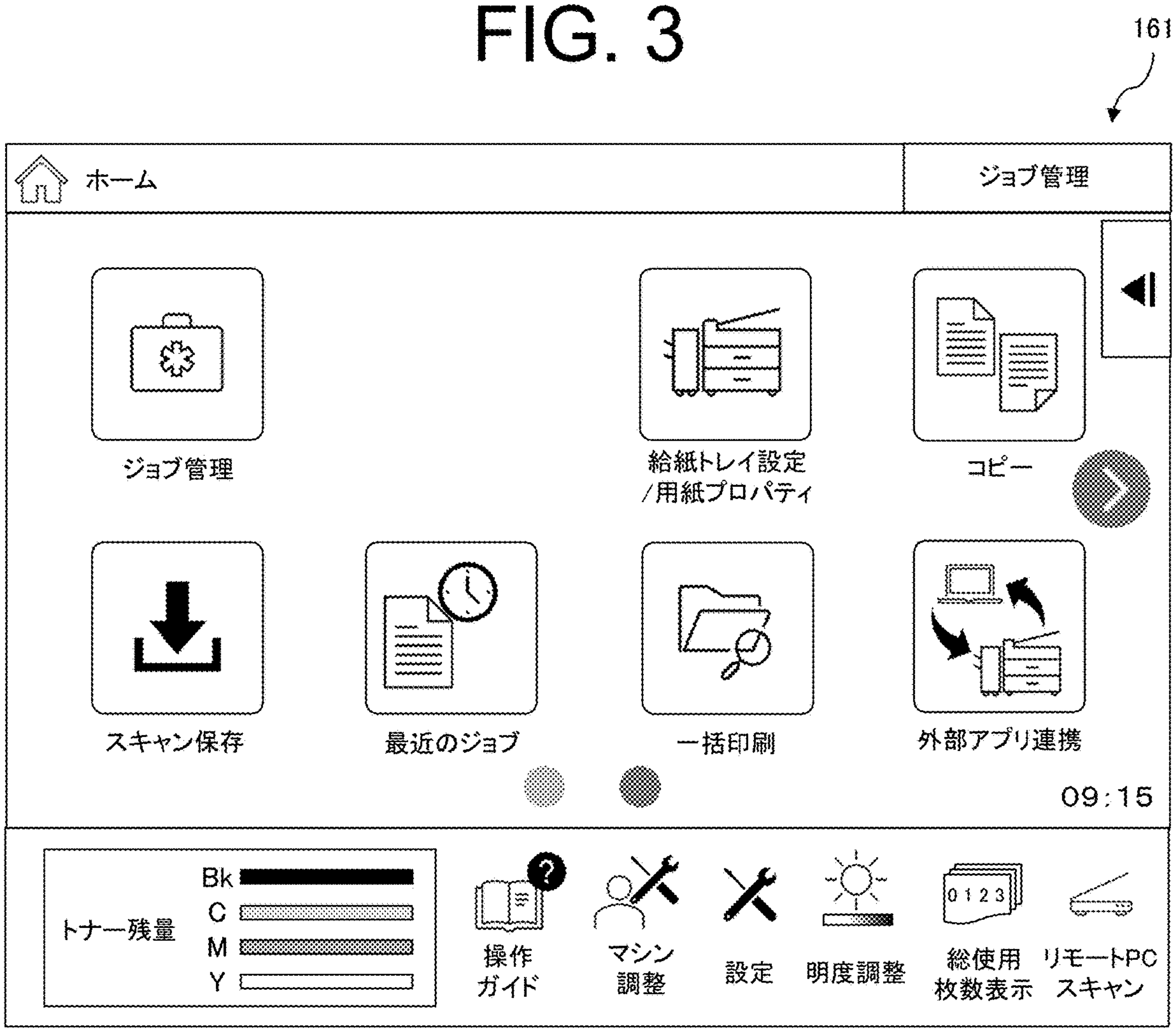
FIG. 3 is an explanatory diagram showing an example of a home screen displayed in Japanese on a display of the digital multifunction machine shown in FIG. 1.

FIG. 3 is an explanatory diagram showing an example of a home screen displayed in Japanese on the display 161 of the digital multifunction machine 1 shown in FIG. 1.

Here, when the user wants to change the home screen displayed in Japanese to English, the user changes the language setting on the language setting screen.

Figure 4:
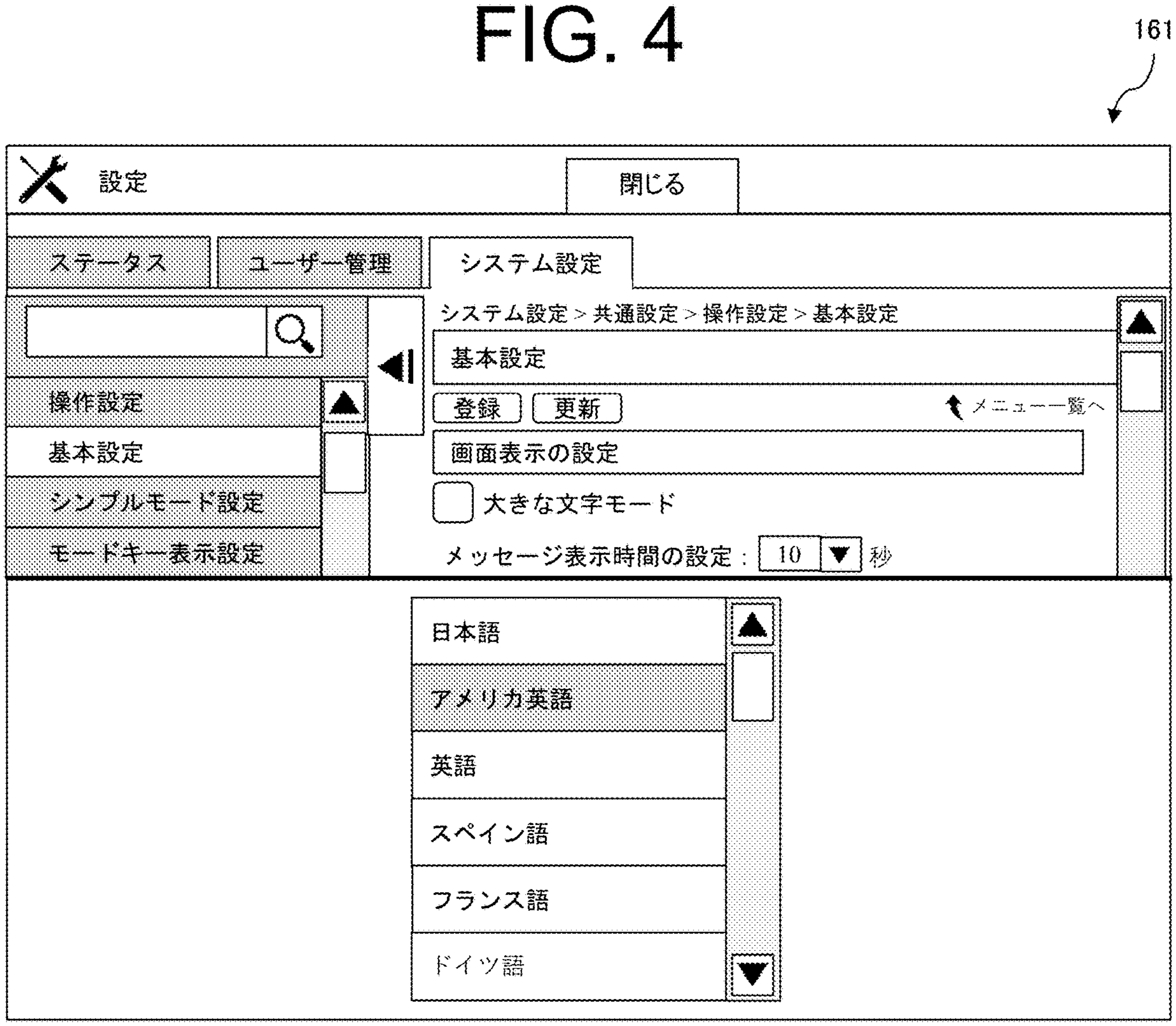
FIG. 4 is an explanatory diagram showing an example of a language setting screen displayed in Japanese on the display of the digital multifunction machine shown in FIG. 1.

FIG. 4 is an explanatory diagram showing an example of the language setting screen displayed on the display 161 of the digital multifunction machine 1 shown in FIG. 1.

The user can change the language by clicking "system setting", "common setting", "operation setting", and "basic setting" in sequence from "setting" in the bottom column of the home screen, selecting a desired language from the list of a plurality of languages shown in FIG. 4 in the "language setting" section, and pressing the "update" key.

In the example of FIG. 4, "American English" is selected from among "Japanese", "American English", "English", "Spanish", "French", "German", and the like.

Figure 5:
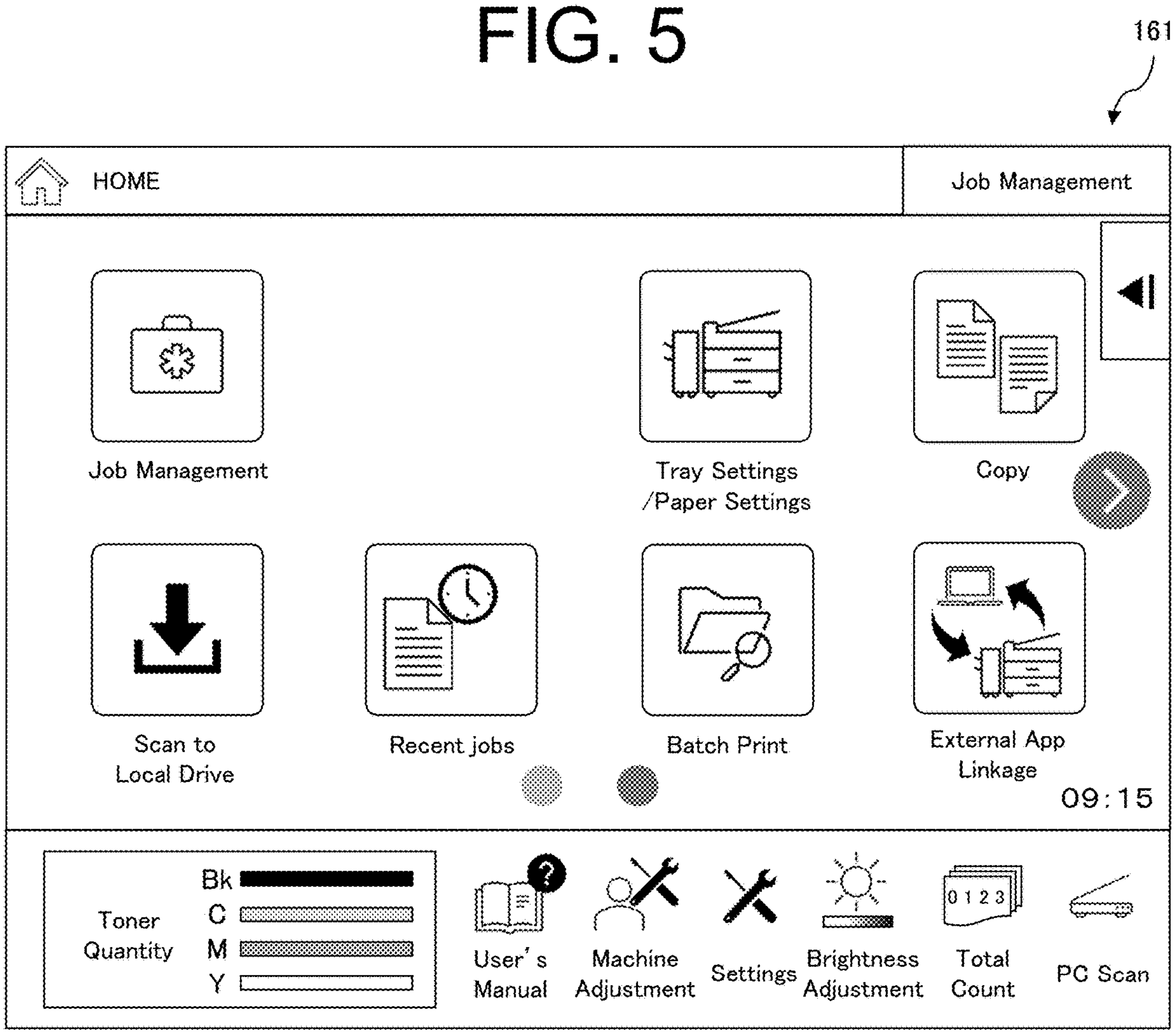
FIG. 5 is an explanatory diagram showing an example of the home screen displayed in English on the display of the digital multifunction machine shown in FIG. 1.

When the "update" key is pressed in this state, the display is switched to the home screen, and the language is switched from Japanese as shown in FIG. 3 to English as shown in FIG. 5.

The digital multifunction machine 1 configured to automatically switch the display to the home screen after the language is changed as described above saves the user the trouble of performing the operation after the language is switched and thus is convenient when it is installed in a convenience store or the like in a tourist area, where the language is likely to be changed frequently.

FIG. 5 is an explanatory diagram showing an example of the home screen displayed in English on the display 161 of the digital multifunction machine 1 shown in FIG. 1.

As shown in FIG. 4, when "American English" is selected in the language setting, the home screen is also displayed in English as shown in FIG. 5.

However, in the case of a digital multifunction machine 1 that is highly likely to be used by users from various countries, the language setting may be performed many times, and a user may erroneously change the set language to a language that the user does not understand.

In such a case, if the user does not understand the language, it is difficult to move from the home screen to the "language setting" screen and change the set language back to the original language.

Accordingly, the digital multifunction machine 1 according to Embodiment 1 of the present disclosure solves this problem by performing the following processing after the language is changed.

Display Processing After Language is Changed in Digital Multifunction Machine 1 According to Embodiment 1 of Present Disclosure Next, display processing after the language is changed in the digital multifunction machine 1 according to Embodiment 1 of the present disclosure will be described with reference to FIG. 6 to FIG. 8.

Figure 6:
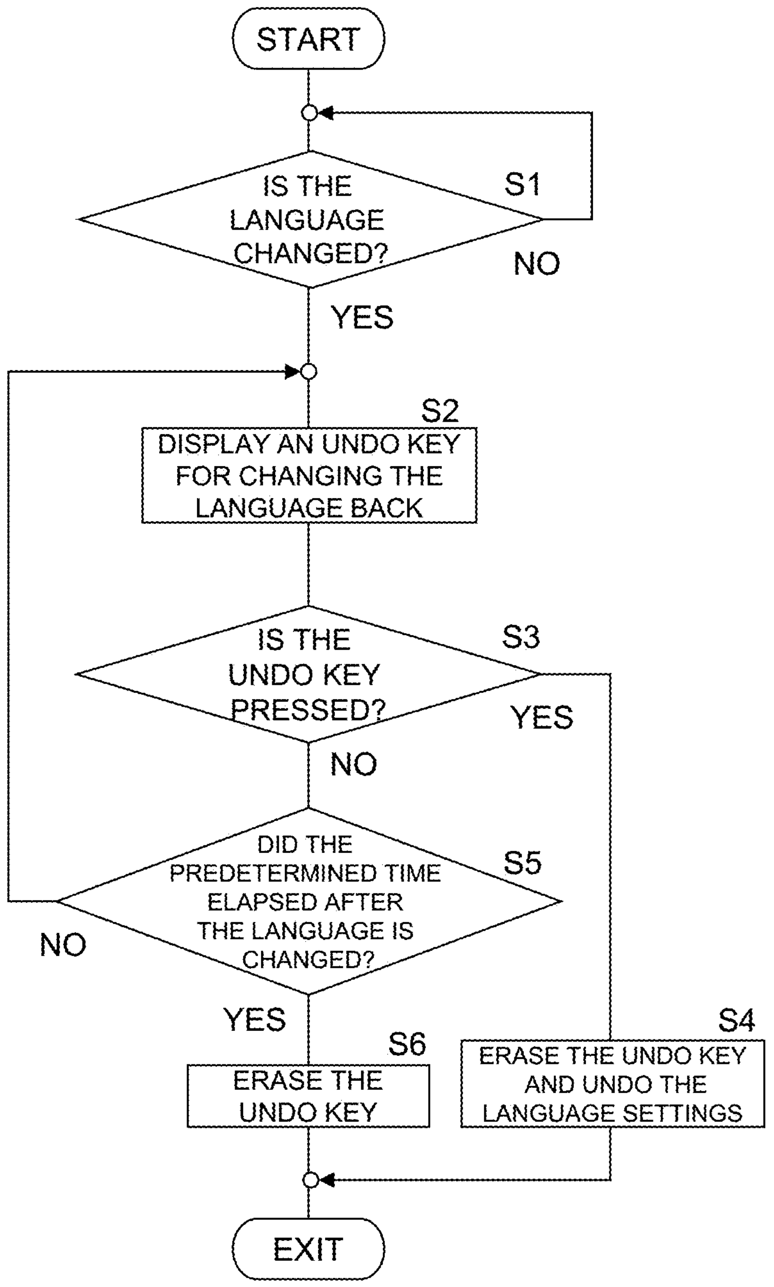
FIG. 6 is a flowchart showing an example of processing after the language is changed in the digital multifunction machine shown in FIG. 1.

FIG. 6 is a flowchart showing an example of processing after the language is changed in the digital multifunction machine 1 shown in FIG. 1.

In step S1 of FIG. 6, the controller 10 of the digital multifunction machine 1 determines whether or not the language has been changed (step S1).

When it is determined that the language has been changed (when the determination in step S1 is Yes), in step S2, the controller 10 causes the display 161 to display an undo key for changing the language back (step S2).

Figure 7:
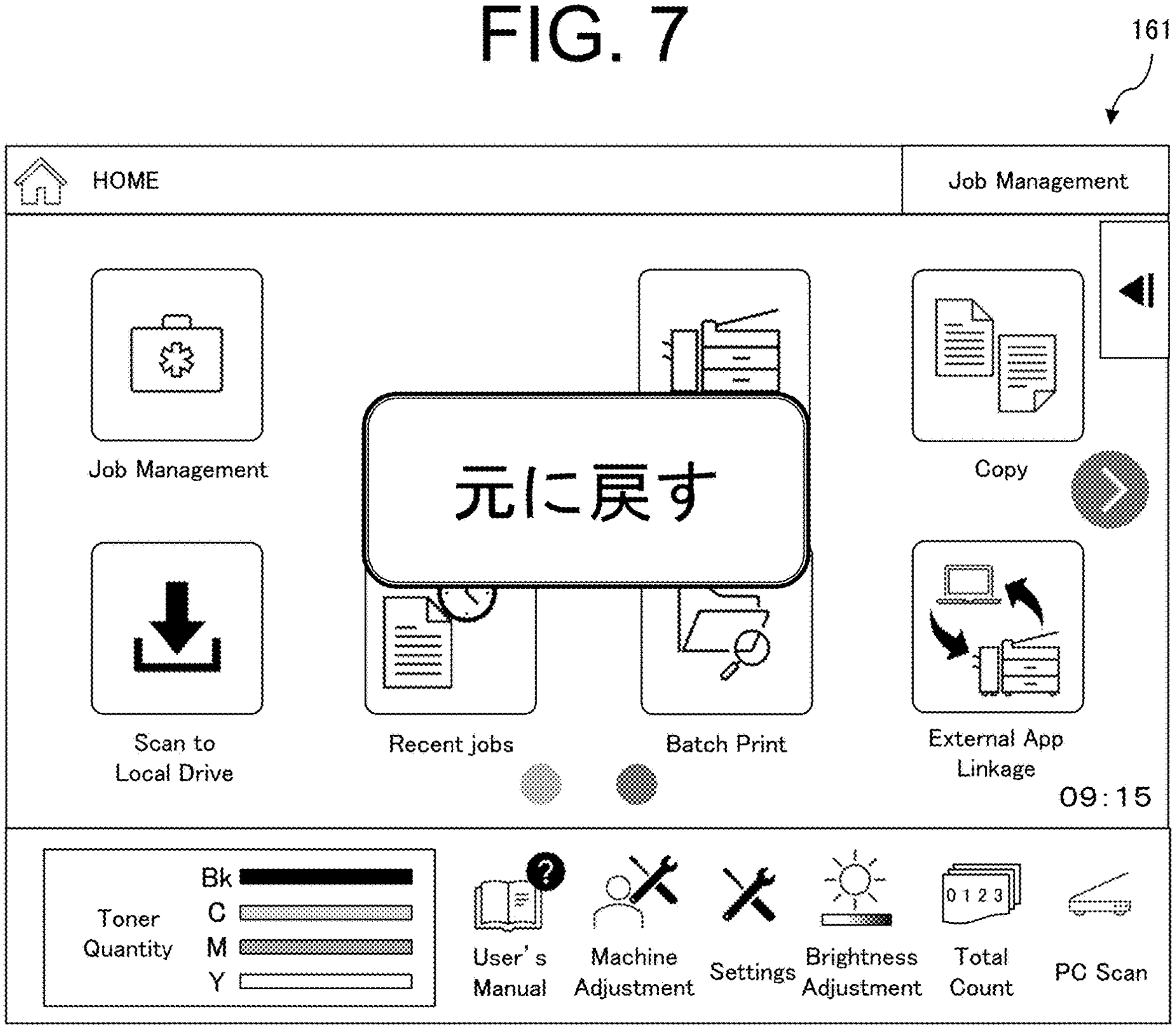
FIG. 7 shows an example of the display of an undo key for changing the language back after the language is changed from Japanese to English in the digital multifunction machine shown in FIG. 1.

FIG. 7 shows an example of the display of the undo key for changing the language back after the language is changed from Japanese to English in the digital multifunction machine 1 shown in FIG. 1.

As shown in FIG. 7, an "undo" key for changing the language back is displayed on the display 161 for a predetermined time.

When the user presses this key, the language is changed back to the previous setting.

Figure 8:
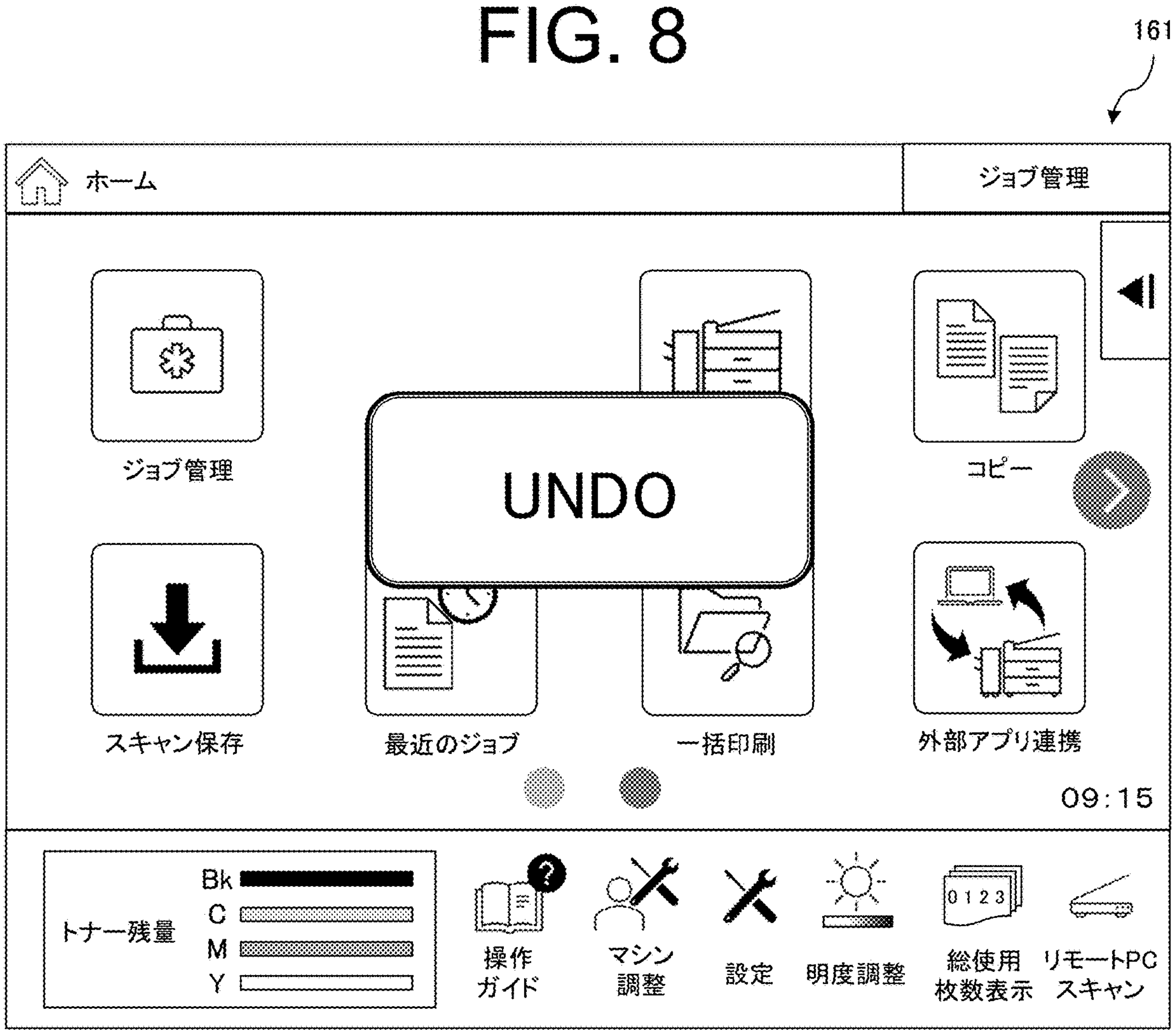
FIG. 8 shows an example of the display of an undo key for changing the language back after the language is changed from English to Japanese in the digital multifunction machine shown in FIG. 1.

FIG. 8 shows an example of the display of the undo key for changing the language back after the language is changed from English to Japanese in the digital multifunction machine 1 shown in FIG. 1.

As shown in FIG. 8, when the language is changed from English to Japanese, the "undo" key is displayed as "UNDO" in English, which is the language before the change.

As described above, by displaying the "undo" key in the language before the change, even if the user has erroneously changed the language and the language after the change is a language that the user does not understand, the language can be easily changed back.

Next, in step S3 of FIG. 6, the controller 10 determines whether or not the "undo" key has been pressed (step S3).

When it is determined that the "undo" key has been pressed (when the determination in step S3 is Yes), in step S4, the controller 10 causes the display 161 to erase the "undo" key and undoes the language setting (step S4), and then ends the processing.

On the other hand, when it is determined that the "undo" key has not been pressed (when the determination in step S3 is No), in step S5, the controller 10 determines whether or not a predetermined time has elapsed after the language is changed (step S5).

In the example of FIG. 4, "10 seconds" is set as the "setting of message display time", but the user can arbitrarily set the display time.

When it is determined that a predetermined time has elapsed after the language is changed (when the determination in step S5 is Yes), in step S6, the controller 10 causes the display 161 to erase the "undo" key (step S6), and then ends the processing.

That is, in this case, the language is not changed back, and the change of the language remains reflected.

On the other hand, when it is determined that the predetermined time has not elapsed after the language is changed (when the determination in step S5 is No), the controller 10 returns the processing to step S2.

Accordingly, the digital multifunction machine 1 in which, even if the user has erroneously changed the language, the language can be changed back more easily than before by displaying the "undo" key in the language before the change for a predetermined time after the language is changed can be achieved.

Modification 1

As Modification 1, instead of displaying the "undo" key in Japanese or the "UNDO" key in English, a "Japanese" key in Japanese (in the case of changing from Japanese to English) or an "English" key in English (in the case of changing from English to Japanese) may be displayed.

In addition to the "undo" key, a message such as "Language has been changed" may also be displayed.

Modification 2

As Modification 2, the "undo" key may be displayed in a symbol or a figure.

Figure 9:
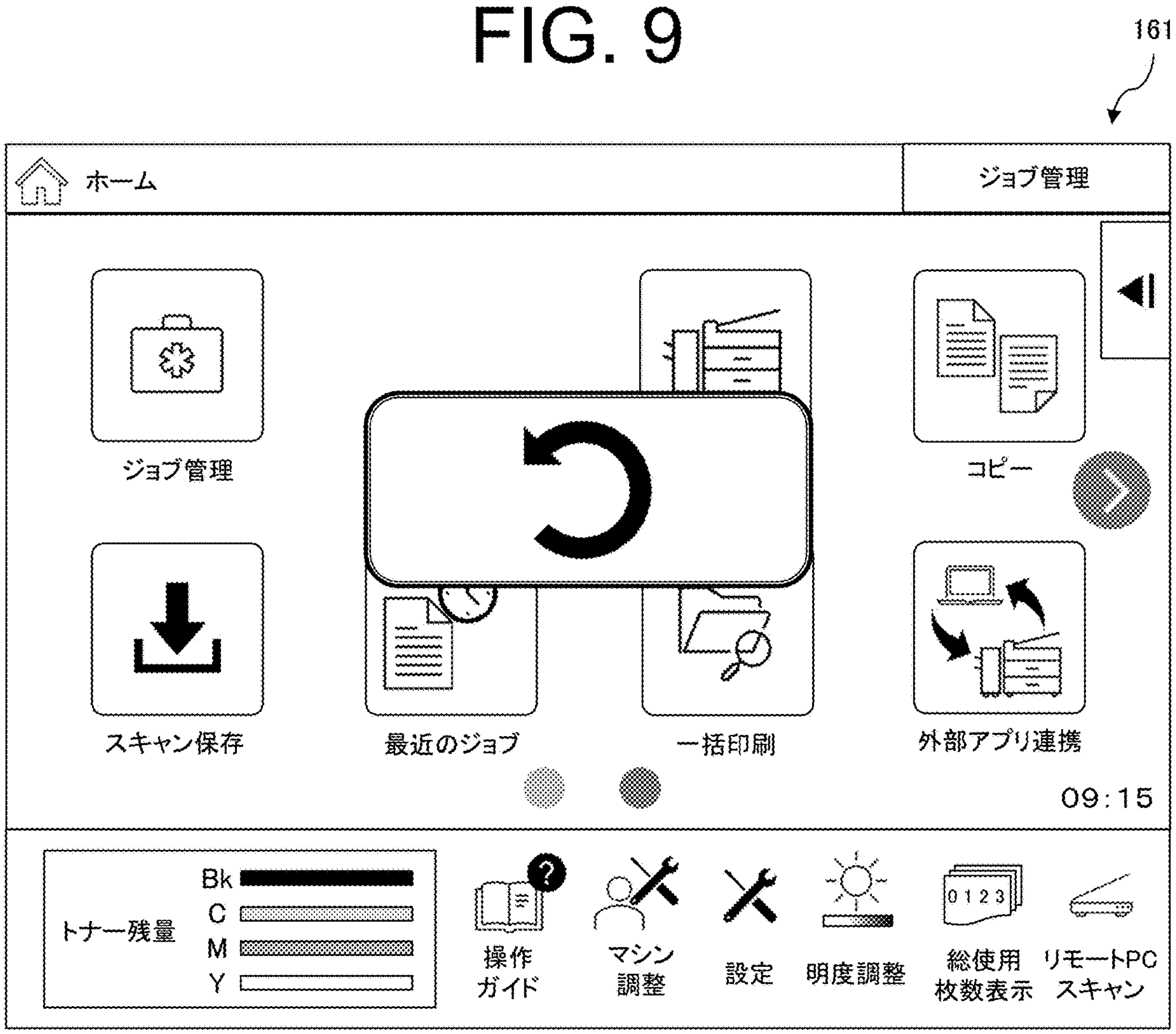
FIG. 9 is another example of the display of the key for changing the language back after the language is changed from English to Japanese in the digital multifunction machine shown in FIG. 1.

FIG. 9 is another example of the display of the undo key for changing the language back after the language is changed from Japanese to English in the digital multifunction machine 1 shown in FIG. 1.

As shown in FIG. 9, when the language is changed, a rotating arrow symbol is displayed as the "undo" key.

Note that the "undo" key is not limited to the rotating arrow symbol, but may include other symbols, letters, numbers, and figures, as long as they can be intuitively understood by users from various countries with different languages.

For example, it may be a mark of a national flag of each country, a letter of each country such as "A" (English) or "あ" (Japanese), an illustration of a person speaking a language, an icon of a keyboard, or the like.

It may also be any combination of letters, numbers, symbols, and figures.

Accordingly, the digital multifunction machine 1 in which, after the language is changed, the "undo" key can be displayed in a representation such as a symbol or a figure which can be understood by users from various countries, so that the language can be changed back more easily than before, even if the user has erroneously changed the language can be achieved.

Embodiment 2

Display Processing After Language is Changed in Digital Multifunction Machine 1 According to Embodiment 2 of Present Disclosure Next, display processing after the language is changed in the digital multifunction machine 1 according to Embodiment 2 of the present disclosure will be described with reference to FIG. 10 and FIG. 11.

Embodiment 1 is characterized in that, after the language is changed, an "undo" key is displayed in the language before the change.

On the other hand, Embodiment 2 is characterized in that, after the language is changed, a message asking the user whether or not to maintain the change of the language is displayed in the language after the change.

Since the schematic configuration of the digital multifunction machine 1 according to Embodiment 2 of the present disclosure is the same as that of Embodiment 1 (FIG. 1 and FIG. 2), the description thereof will be omitted.

Figure 10:
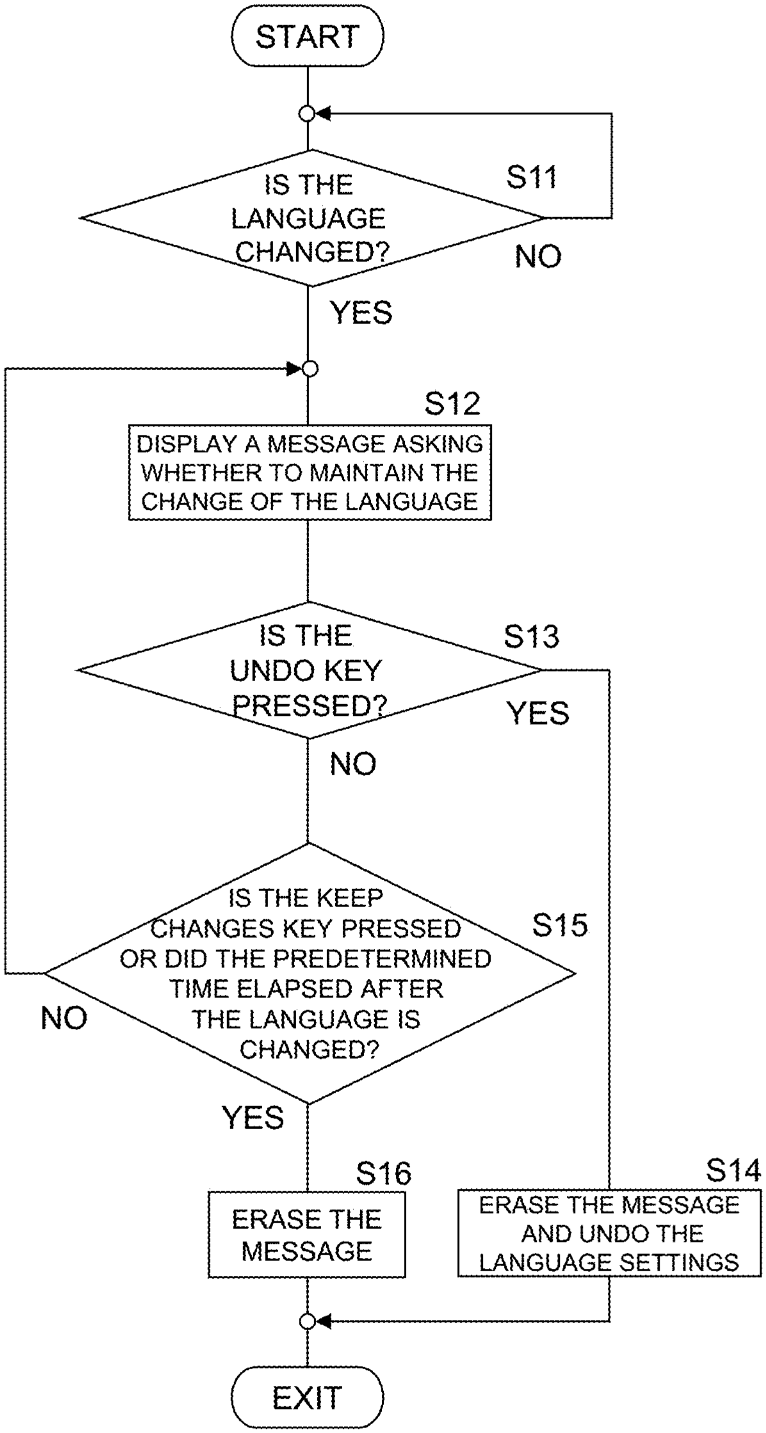
FIG. 10 is a flowchart showing an example of processing after the language is changed in a digital multifunction machine according to Embodiment 2 of the present disclosure.

FIG. 10 is a flowchart showing an example of processing after the language is changed in the digital multifunction machine 1 according to Embodiment 2 of the present disclosure.

In step S11 of FIG. 10, the controller 10 determines whether or not the language has been changed (step S11).

When it is determined that the language has been changed (when the determination in step S11 is Yes), in step S12, the controller 10 causes the display 161 to display a message asking whether or not to maintain the change of the language (step S12).

Figure 11:
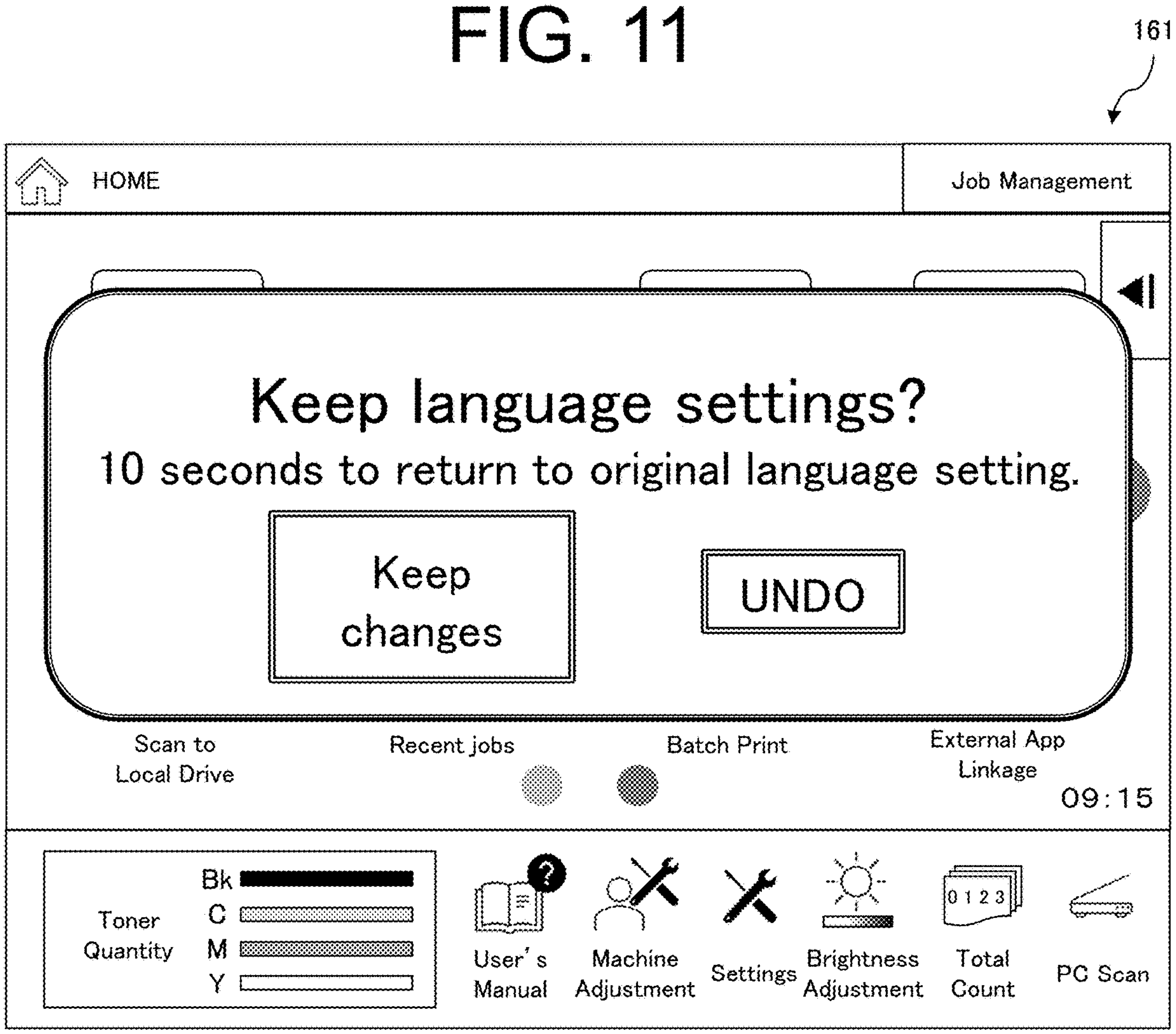
FIG. 11 is an example of the display of a message asking whether or not to maintain the change of the language after the language is changed from Japanese to English in the digital multifunction machine according to Embodiment 2 of the present disclosure.

FIG. 11 is an example of the display of the message asking whether or not to maintain the change of the language after the language is changed from Japanese to English in the digital multifunction machine 1 shown in FIG. 1.

In the example shown in FIG. 11, an English message "Keep language settings? 10 seconds to return to original language setting." is displayed on the display 161 along with an inquiry as to whether or not to maintain the language setting.

A "Keep changes" key and an "UNDO" key are also displayed along with the above message.

Unlike Embodiment 1, the message and keys are displayed in the language after the change.

As described above, by displaying the message and keys in the language after the change, even if the user has erroneously changed the language, the language is automatically changed back to the original language after a predetermined time because, when the message and keys are displayed in a language that the user does not understand, the user does not press the key and leaves it alone.

Next, in step S13 of FIG. 10, the controller 10 determines whether or not the "undo" key has been pressed (step S13).

When it is determined that the "undo" key has been pressed (when the determination in step S13 is Yes), in step S14, the controller 10 causes the display 161 to erase the message and undoes the language setting (step S14), and then ends the processing.

On the other hand, when it is determined that the "undo" key has not been pressed (when the determination in step S13 is No), in step S15, the controller 10 determines whether the "Keep changes" key of the language has been pressed or a predetermined time has elapsed after the language is changed (step S15).

When it is determined that the "Keep changes" key of the language has been pressed or when a predetermined time has elapsed after the language is changed (when the determination in step S15 is Yes), in step S16, the controller 10 causes the display 161 to erase the message (step S16), and then ends the processing.

On the other hand, when it is determined that the "Keep changes" key of the language has not been pressed and the predetermined time has not elapsed after the language is changed (when the determination in step S15 is No), the controller 10 returns the processing to step S12.

Accordingly, the digital multifunction machine 1 in which, even if the user has erroneously changed the language, the language can be changed back more easily than before by displaying the message and key in the language before the change for a predetermined time after the language is changed can be achieved.

Embodiment 3

Display Processing After Language is Changed in Digital Multifunction Machine 1 According to Embodiment 3 of Present Disclosure Next, display processing after the language is changed in the digital multifunction machine 1 according to Embodiment 3 of the present disclosure will be described with reference to FIG. 12.

Embodiment 1 is characterized in that, after the language is changed, an "undo" key is displayed in the language before the change, and when the "undo" key is pressed, the language is changed back.

On the other hand, Embodiment 3 is characterized in that, after the language is changed, an "undo" key is displayed in the language before the change, and when the "undo" key is pressed, the language setting screen is displayed.

Figure 12:
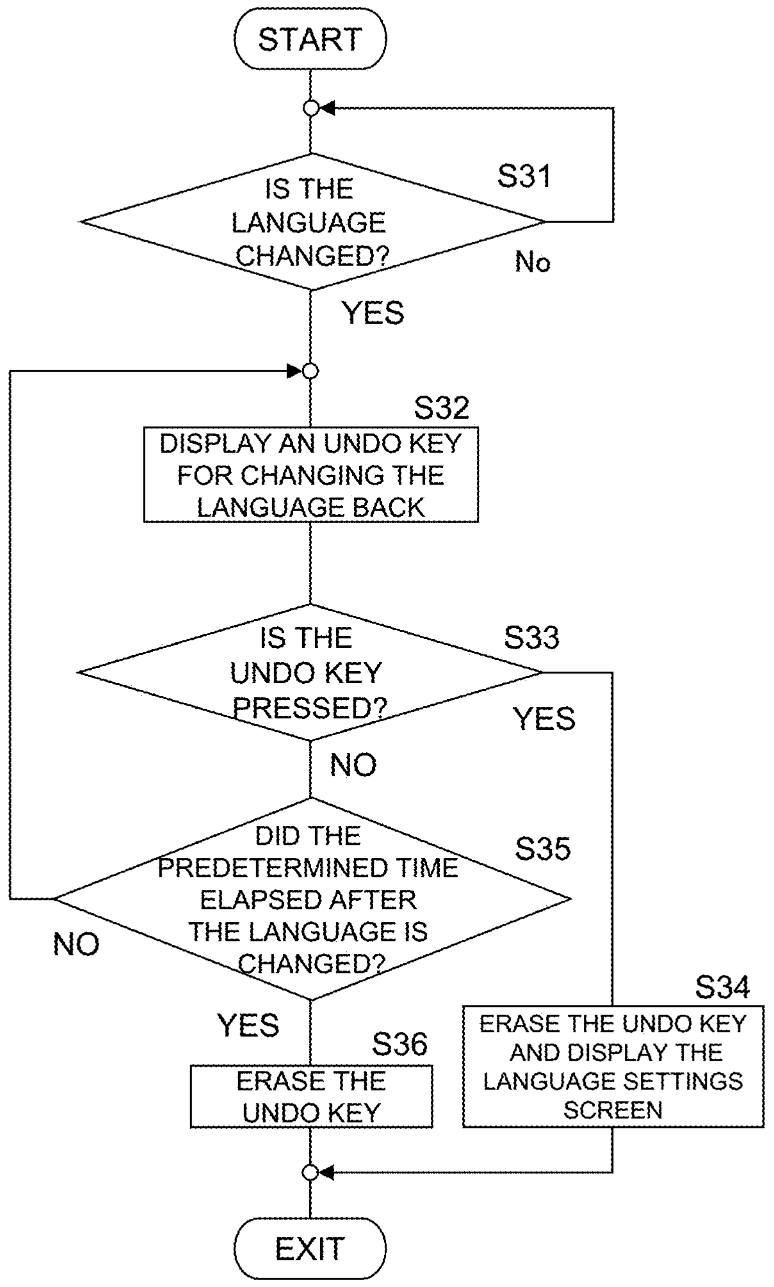
FIG. 12 is a flowchart showing an example of processing after the language is changed in a digital multifunction machine according to Embodiment 3 of the present disclosure.

FIG. 12 is a flowchart showing an example of processing after the language is changed in the digital multifunction machine 1 according to Embodiment 3 of the present disclosure.

In step S31 of FIG. 12, the controller 10 of the digital multifunction machine 1 determines whether or not the language has been changed (step S31).

When it is determined that the language has been changed (when the determination in step S31 is Yes), in step S32, the controller 10 causes the display 161 to display an undo key for changing the language back (step S32).

Next, in step S33, the controller 10 determines whether or not the "undo" key has been pressed (step S33).

When it is determined that the "undo" key has been pressed (when the determination in step S33 is Yes), in step S34, the controller 10 causes the display 161 to erase the "undo" key and display the language setting screen (step S34), and then ends the processing.

Even if the user has erroneously changed the language, displaying the language setting screen in this manner allows the language to be changed to a desired language easily.

On the other hand, when it is determined that the "undo" key has not been pressed (when the determination in step S33 is No), in step S35, the controller 10 determines whether or not a predetermined time has elapsed after the language is changed (step S35).

When it is determined that a predetermined time has elapsed after the language is changed (when the determination in step S35 is Yes), in step S36, the controller 10 causes the display 161 to erase the "undo" key (step S36), and then ends the processing. On the other hand, when it is determined that the predetermined time has not elapsed after the language is changed (when the determination in step S35 is No), the controller 10 returns the processing to step S32.

Accordingly, the digital multifunction machine 1 in which, even if the user has erroneously changed the language, the "undo" key is displayed in the language before the change for a predetermined time after the language is changed and the language setting screen is displayed when the key is pressed, so that the language can be changed back more easily than before can be achieved.

Modification

As a modification, the language setting screen may be displayed even when the message is erased and the language is changed back as shown in Embodiment 2 (step S14 in FIG. 10).

Embodiment 4

Display Processing when Language is Changed in Digital Multifunction Machine 1 According to Embodiment 4 of Present Disclosure Next, display processing when the language is changed in the digital multifunction machine 1 according to Embodiment 4 of the present disclosure will be described with reference to FIG. 13 and FIG. 14.

Embodiment 2 is characterized in that, after the language is changed, a message asking the user whether or not to maintain the change of the language is displayed in the language after the change.

On the other hand, Embodiment 4 is characterized in that, when the language is changed, the language is not immediately changed, but a message asking the user whether or not to change the language to the new language is displayed.

Since the schematic configuration of the digital multifunction machine 1 according to Embodiment 4 of the present disclosure is the same as that of Embodiment 1 (FIG. 1 and FIG. 2), the description thereof will be omitted.

Figure 13:
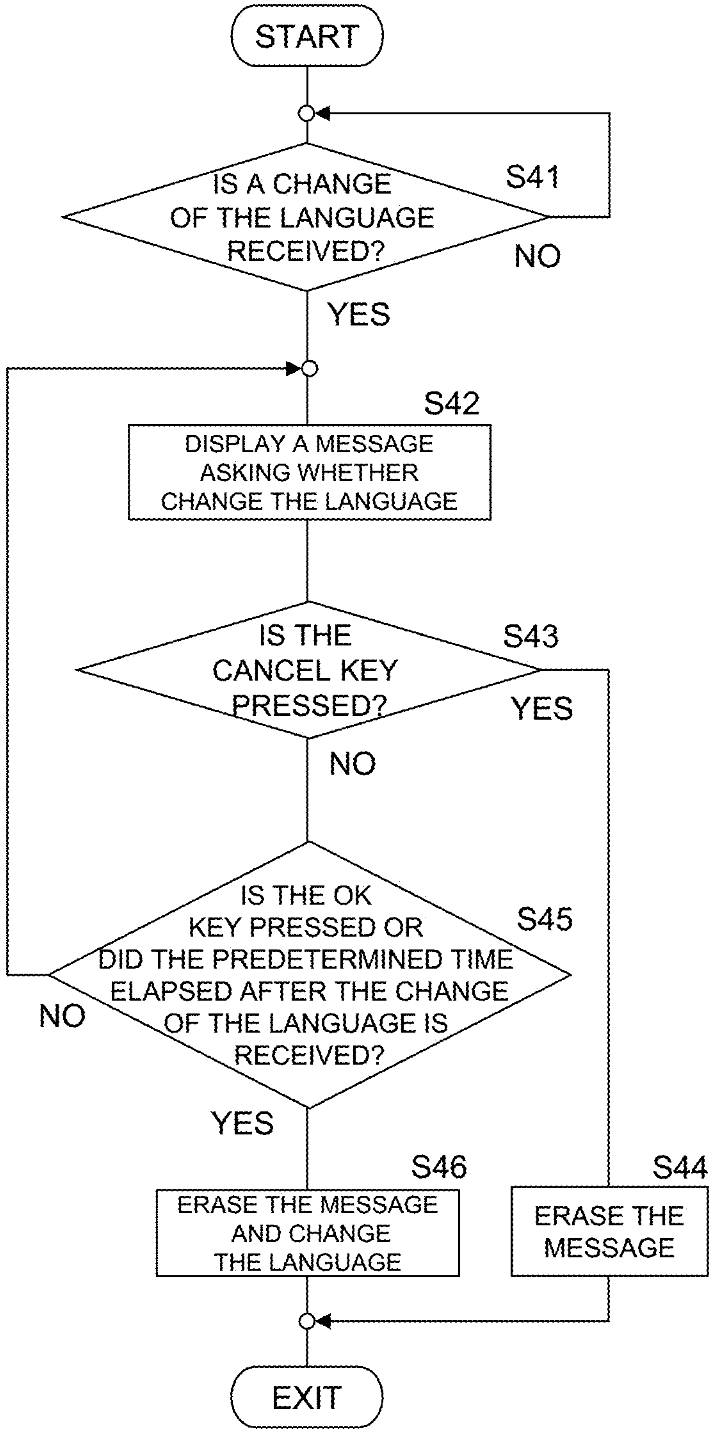
FIG. 13 is a flowchart showing an example of processing when the language is changed in a digital multifunction machine according to Embodiment 4 of the present disclosure.

FIG. 13 is a flowchart showing an example of processing when the language is changed in the digital multifunction machine 1 according to Embodiment 4 of the present disclosure.

In step S41 of FIG. 13, the controller 10 determines whether or not a change of the language has been received (step S41).

When it is determined that a change of the language has been received (when the determination in step S41 is Yes), in step S42, the controller 10 causes the display 161 to display a message asking whether or not to change the language (step S42).

Figure 14:
FIG. 14 is an example of the display of a message asking whether or not to change the language when the language is changed from Japanese to English in the digital multifunction machine according to Embodiment 4 of the present disclosure.

FIG. 14 is an example of the display of the message asking whether or not to change the language when the language is changed from Japanese to English in the digital multifunction machine 1 according to Embodiment 4 of the present disclosure.

In the example shown in FIG. 14, an English message "Change language settings? 10 seconds until language is changed to English" is displayed on the display 161 along with an inquiry as to whether to change the language.

An "OK" key and a "cancel (CANCEL)" key are also displayed along with the above message.

Different from Embodiment 2, the language has not been changed when the message is displayed.

By displaying the message and the key in the language after the change as described above, the user can know in advance from the message to which language the language is actually changed, the language will not be changed to the wrong language by leaving the key unpressed even if the user has erroneously changed the language setting.

For example, if an American erroneously selects "Spanish" when changing the language on the language setting screen, a Spanish message and key are displayed so that the user can easily notice that the user has selected the wrong language.

Next, in step S43 of FIG. 13, the controller 10 determines whether or not the "cancel" key has been pressed (step S43).

When it is determined that the "cancel" key has been pressed (when the determination in step S43 is Yes), in step S44, the controller 10 causes the display 161 to erase the message (step S44), and then ends the processing.

In this case, the language is not changed.

On the other hand, when it is determined that the "cancel" key has not been pressed (when the determination in step S43 is No), in step S45, the controller 10 determines whether the "OK" key has been pressed or whether a predetermined time has elapsed after the change of the language has been received (step S45).

When it is determined that the "OK" key has been pressed or when it is determined that a predetermined time has elapsed after the change of the language has been received (when the determination in step S45 is Yes), in step S46, the controller 10 causes the display 161 to erase the message, changes the language (step S46), and then ends the processing.

On the other hand, when it is determined that the "OK" key has not been pressed and the predetermined time has not elapsed after the change of the language has been received (when the determination in step S45 is No), the controller 10 returns the processing to step S42.

Accordingly, the digital multifunction machine 1 in which, even if the user has erroneously changed the language setting, when the language is changed, the message and key are displayed in the language after the change for a predetermined time as described above, so that the language is not changed to the wrong language can be achieved.

Modification

As a modification, the language setting screen may be displayed when the "cancel" key is pressed.

In this way, if the user notices that the language setting is wrong and presses the "cancel" key, the language can be changed again to the desired language.

Preferred modes of the present disclosure include combinations of any of the above-described modes.

In addition to the embodiments described above, there may be various modifications of the present disclosure. These modifications should not be construed as not falling within the scope of the present disclosure. The present disclosure should include all modifications equivalent to the claims and within the above scope.

What is claimed is:

1. An image display apparatus comprising:
- a display configured to display various types of information to a user;
- an operation acceptor configured to receive a change of a language of the various types of information; and
- one or more controllers configured to control the display and the operation acceptor, wherein:
- when the operation acceptor receives the change of the language, the one or more controllers change the language and cause the display to display, for a predetermined display time, an undo key for changing the language back,
- the undo key is displayed in the language before the change, and
- the one or more controllers further cause the display to:
  - erase the undo key and change the language back when the undo key is pressed, and
  - erase the undo key when the predetermined display time has elapsed without the undo key being pressed.

2. The image display apparatus according to claim 1, wherein the undo key is displayed in at least one of a letter, a number, a symbol, and a figure.

3. The image display apparatus according to claim 1, wherein after the one or more controllers erase the undo key and change the language back, the one or more controllers further cause the display to display a language setting screen.

4. An image display apparatus comprising:
- a display configured to display various types of information to a user;
- an operation acceptor configured to receive a change of a language of the various types of information; and
- one or more controllers configured to control the display and the operation acceptor, wherein:
- when the operation acceptor receives the change of the language, the one or more controllers change the language and cause the display to display, for a predetermined display time, a message asking whether to maintain the change of the language, a key for maintaining the change of the language, and an undo key for changing the language back, and
- the message, the key for maintaining the change of the language, and the undo key for changing the language back are displayed in another language after the language has been changed.

* * * * *